|| United States Patent [19]
Dobson et al.

[11] 3,728,349
[45] Apr. 17, 1973

[54] COMPOSITIONS FOR AND METHOD OF TREATING INFLAMMATORY CONDITIONS

[75] Inventors: Thomas A. Dobson, Dollard des Ormeaux, Quebec; J. Guy Rochefort, Saint Laurent, Montreal, Quebec, both of Canada

[73] Assignee: American Home Products Corporation, New York, N.Y.

[22] Filed: June 26, 1970

[21] Appl. No.: 50,296

[30] Foreign Application Priority Data

Aug. 7, 1969 Canada..............................058,988

[52] U.S. Cl.................................................424/285
[51] Int. Cl. ............................................A61k 27/00
[58] Field of Search.....................................424/285

[56] References Cited

OTHER PUBLICATIONS

J.A.C.S., 61 – pp. 2836–2845 (1939).

Primary Examiner—Stanley J. Friedman
Attorney—Andrew Kafko, Dwight J. Potter and Joseph Martin Weigman

[57] ABSTRACT

Compositions for oral or parenteral administration containing, as the active ingredient, γ-oxo-2-dibenzofuranbutyric acid or its water-soluble pharmaceutically acceptable salts, and methods for treating inflammatory conditions by administering said compositions.

6 Claims, No Drawings

COMPOSITIONS FOR AND METHOD OF TREATING INFLAMMATORY CONDITIONS

This invention relates to compositions for and methods of treating inflammatory conditions. More specifically, this invention relates to compositions comprising as the active ingredient the compound γ-oxo-2-dibenzofuranbutyric acid and its water-soluble pharmaceutically acceptable salts such as, for example, the sodium salt and to methods for treating inflammatory conditions by administering said compositions.

The compound γ-oxo-2-dibenzofuranbutyric acid has been described by F. Mayer and W. Krieger in Berichte, Vol. 55B, p. 1659 (1922) and by H. Gilman et al., J. Amer. Chem. Soc., Vol. 61, 2842 (1939). The compound may be represented by the following formula:

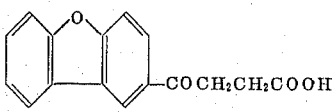

It has now been found that the above compound possesses important anti-inflammatory properties and a low order of toxicity, which makes it particularly valuable for use as an anti-inflammatory agent in the treatment of inflammatory conditions. The compound is also exceptionally well tolerated upon prolonged administration of high doses, and possesses a highly favourable therapeutic index. The compound also possesses antipyretic activity. As an added advantage, the compound does not cause formation of gastro-intestinal ulcers when tested at therapeutic dose levels for ulcerogenic activity in a modification of a known method.

The compound γ-oxo-2-dibenzofuranbutyric acid which has only limited solubility in water is easily transformed into highly water-soluble pharmaceutically acceptable salt thereof by titrating with a water-soluble base such as, for example, an alkali metal, alkaline earth metal, ammonium or substituted ammonium hydroxide, or with an organic base. The preferred salt is the sodium salt, obtainable from the free acid by titrating with sodium hydroxide. As substituted ammonium salts, there are particularly preferred those derived from, for example, the following amines: lower mono-, di- and trialkylamines, the alkyl radicals of which contain up to 4 carbon atoms, such as methylamine, dimethylamine, trimethylamine, ethylamine, di- and triethylamine, methyl-ethylamine, and the like; mono-, di- and trialkanolamines, the alkanol radicals of which contain up to 4 carbon atoms, such as mono-, di- and triethanolamine; alkylenediamines which contain up to 6 carbon atoms, such as hexamethylene-diamine; cyclic saturated or unsaturated bases containing up to 6 carbon atoms, such as pyrrolidine, piperidine, morpholine, piperazine and their N-alkyl and N-hydroxyalkyl derivatives, such as N-methyl-morpholine and N-(2-hydroxyethyl)-piperidine, as well as pyridine. Furthermore, there may be mentioned the corresponding quaternary salts, such as the tetraalkyl (for example tetramethyl), alkyl-alkanol (for example methyl-triethanol and trimethyl-monoethanol) and cyclic ammonium salts, for example the N-methyl-pyridinium, N-methyl-N-(2-hydroxyethyl)-pyrrolidinium, N,N-dimethyl-morpholinium, N-methyl-N-(2-hydroxyethyl)-morpholinium, N,N-dimethyl-piperidinium and N-methyl-N-(2-hydroxyethyl)-piperidinium salts, which are characterised by an especially good water-solubility. In principle, however, there can be used all ammonium salts which are physiologically compatible. The alumunium and iron salts are also useful, and are preferably prepared by double decomposition. Such salts, in particular the sodium salt, are pharmaceutically equivalent to the acid itself. They have the advantage of being more freely water-soluble and may be administered orally in the form of tablets or capsules, together with suitable excipients and/or carriers, or they may be administered parenterally in the form of solutions which may, in turn, contain other solutes such as pharmaceutically inactive compounds in sufficient quantity to make such solutions isotonic and/or preservatives to prevent bacterial contamination. It should be noted, however, that the free acid is pharmaceutically fully effective upon oral administration, being sufficiently absorbed in the gastrointestinal tract to provide effective concentrations in body fluids, and that it may be administered orally in the form of tablets or capsules together with suitable excipients and/or carriers, or parenterally in the form of suspensions in pharmaceutically acceptable solvents or suspending media, such as aqueous suspensions or solutions of vegetable gums, carboxymethylcellulose, polyethyleneglycols, and the like, or in non-aqueous media such as in pharmaceutically acceptable vegetable oils, for example in sesame oil. Such compositions for oral or parenteral administration may contain from 25 – 250 mg of the active ingredient per dosage form, and are particularly useful in the treatment of inflammatory conditions, expecially those conditions which are associated with degenerative joint diseases and musculoskeletal disorders in humans and in animals.

Preferred dosage forms are those described in Examples 1, 2 or 3. Such dosage forms are particularly useful in the treatment of degenerative joint diseases in humans such as, for example gout, and gouty arthritis, osteoarthritis traumatic,atrophic, senescent, or rheumatoid arthritis, and in the treatment of miscellaneous musculoskeletal disorders such as, for example, bursitis, systemic lupus erythematosus, sciatica, low back pain, fibromyositis and other collagen diseases. The quantities of such dosage forms to be administered and the duration of treatment will vary with the particular disease or disorder to be treated and with the susceptibility of the particular individual, and such dosage forms may be administered so as to provide total amounts of from 1 – 30 mg of γ-oxo-2-dibenzofuranbutyric acid per kilogram of body weight per day, preferably in divided doses. In general, certain forms of musculoskeletal disorders associated with acute attacks of pain such as, for example, gout or sciatica, are preferably treated with higher doses over comparatively short periods of time, for example with 10 – 30 mg per kilogram body weight per day over periods of time of from 1 – 3 weeks. On the other hand, degenerative joint diseases or other collagen diseases of a more chronic nature, especially cases of long standing,are preferably treated with comparatively lower doses over prolonged periods of time, for example with 3 – 15 mg per kilogram body weight per day over periods of time of from one to several months. Some measure of relief from pain, fever, or inflammation is usually experienced within 3 – 10 days after initiation of treatment, but treatment may have to be continued, as noted above, for prolonged periods of time to obtain a satisfactory response, especially in cases where articulation of joints is involved.

In connection with the frequently occurring necessity of having to administer anti-inflammatory drugs for prolonged periods of time, the low order of toxicity and the absence of undesirable side-effects, especially those of a gastro-intestinal nature, make γ-oxo-2-dibenzo-furanbutyric acid particularly valuable in the treatment of degenerative joint diseases and certain musculo skeletal disorders in humans and in animals such as, for example, race horses. In the field of non-steroidal anti-inflammatory drugs used in human therapy there are at the present time three compounds which may be regarded as the drugs of choice, viz., acetylsalicylic acid (aspirin), phenylbutazone, and indomethacin. Aspirin is effective only in comparatively high doses, which are reported in "Side Effects of Drugs", Vol. 6, pp. 101 ff, Williams and Wilkins, and Excerpta Medica Foundation, Baltimore and Amsterdam, 1968, to cause a significant incidence of undesirable side-effects such as, nausea, tinnitus, temporary deafness, giddiness, bleeding from the intestinal tract, and aggravation of peptic ulcers. Phenylbutazone is reported by the same source as causing anemia and agranulocytosis among others, but its most serious undesirable side-effects seems to be localized in the gastro-intestinal tract, with the incidence of peptic ulceration caused by the drug, being reported as high as 1 – 2 per cent. The total incidence of undesirable side-effects may reach 30–45 per cent, with interruption of treatment becoming necessary in 8 – 10 per cent of patients. Similar adverse effects upon the gastro-intestinal tract have also been reported by the above source for indomethacin, but it would appear that the most common side-effects of that drug are encountered in the central nervous system, as the incidence of headaches is reported to be as high as 20 – 60 per cent. In contradistinction to the drugs named above, γ-oxo-2-dibenzofuranbutyric acid is well tolerated even in comparatively high doses and does not seem to have any adverse effects upon the gastro-intestinal tract.

It is a distinguishing attribute of the anti-inflammatory drugs that their effects, as characterized by pharmacological tests for determining anti-inflammatory activity in experimental animals, are mainly also present in humans. A leading authority in this field, B. Silvestrini in "Methods in Drug Evaluation", North-Holland Publishing Company, Amsterdam 1966, p. 46 ff, has stated that there is a solid basis in laboratory tests for the formulation and design of anti-inflammatory drugs. This statement, coupled with the fact that the modern anti-inflammatory drugs currently most widely used in clinical practice, especially phenylbutazone and indomethacin, have also shown anti-inflammatory activity in the pharmacological tests on experimental animals described below, points to the solid correlation between pharmacological results and clinical effectiveness in the field of anti-inflammatory drugs. This high degree of correlation is shown in an especially convincing manner in the test for alleviating established inflammation more closely described in Example 7.

Among such tests currently employed in pharmacology are the carragheenin paw edema test in the rat, the granuloma pouch test in the rat, and the tests for reduction of inflammation or for alleviating established inflammation, both induced by mycobacterial adjuvant in the mouse or in the rat.

The carragheenin paw edema test described by Winter et al. in Proc. Soc. Exp. Biol. Med. Vol. 111, p. 544 (1962) consists in injecting carragheenin into the subplantar area of the hind paw of the rat and, in our modification, measuring the increase in volume caused by the resulting edema 3 hours later by plethysmography in mercury and expressing volumes as grams of mercury displaced. The compound to be tested is administered orally in a vehicle 1 hour before the carragheenin. Control animals receive the vehicle only. The results are expressed as percent reduction in edematous swelling calculated as $(\Delta_{control} - \Delta_{treated})/\Delta_{control} \times 100$, where $\Delta_{control}$ is the increase in volume measured in untreated controls and $\Delta_{treated}$ is the increase in volume found in the treated animals. In this test, indomethacin used as a standard gave about 50 percent reduction at doses of 10 mg/kg, while γ-oxo-2-dibenzofuranbutyric acid gave about 40 percent reduction at doses of 100 mg/kg.

The granuloma pouch test, in a modification of the methods described by H. Selye in "Recent Progress in Hormone Research", Academic Press Inc., Vol.8, p. 117 (1953) and by Robert and Nezamis in Acta Endrocrinol. Vol. 25, p. 105 (1957) consists in the formation of a pouch by the injection of 25 ml of air into the dorsal subcutaneous tissue of the rat, into which pouch 0.1 ml of croton oil is injected. Over a period of 5 days, exudate accumulates within the pouch, which also becomes lined with granulomatous tissue. On day 5 the volume of exudate and the wet weight of the granuloma are determined, and 8–10 ml of exudate and about 4 g of granuloma are found in untreated controls. The compound to be tested is administered orally in a vehicle immediately following the induction of the granuloma pouch, and control animals receive the vehicle only at the same time. Administration of test compound and vehicles is continued once daily for the five days of the test. In this test indomethacin in doses of 5 mg/kg effected about 40 percent reduction in the volume of exudate and in the wet weight of the granuloma while the compound γ-oxo-2-dibenzofuranbutyric acid in doses of 50 mg/kg gave about 40 percent reduction in volume of exudate and no reduction in the wet weight of the granuloma.

The tests for reduction of inflammation or for alleviating established inflammation, both induced by mycobacterial adjuvant, in a modification of the method described by Newbould in Brit. J. Pharmacol. Vol. 21, p. 127 (1963), consist in injecting intradermally into the plantar surface of the left hind paw of mice or rats a fine suspension of dead tubercle bacilli in liquid paraffin. The tubercle bacilli are derived from human strains PM, DT, and C which were grown for 8 weeks, killed by steam, and dried in a vacuum oven. They are suspended in liquid paraffin at a concentration of 5 mg/ml and this suspension is called the mycobacterial adjuvant. This injection causes a characteristic swelling not only in the injected hind paw, but after a certain amount of time also in the non-injected hind paw, both of which are measured by plethysmography and usually amount to approximately 100 percent increase in volume of the respective hind paw over normal controls which had not been injected with the mycobacterial adjuvant.

In the test for the reduction of inflammation the compound to be tested is administered orally in a vehicle to a group of mice or rats daily for 14 days, starting on the day of the mycobacterial adjuvant injection. At the end of that period the volumes of both the injected and the non-injected hind paws are determined by plethysmography in mercury and expressed in grams of mercury displaced. Another group of mice or rats is injected with the mycobacterial adjuvant in the same manner as above and receives the vehicle only as controls. Results are again calculated as percentage reduction in swelling of the respective hind paw as described above. In this test, indomethacin in doses of 2.5 mg/kg, phenylbutazone in doses of 75–150 mg/kg, and acetylsalicyclic acid in doses of 200–400 mg/kg, all given orally daily for 14 days, effected a reduction in swelling of about 50%, while the compound γ-oxo-2-dibenzofuranbutyric acid gave a reduction in swelling of about 50 percent when administered in oral doses of 50 mg/kg/day for 14 days.

In the same test, indomethacin in oral doses of 5 mg/kg was found to be not tolerated and caused 100 percent deaths; phenylbutazone gave about 50 percent mortality at 300 mg/kg; while oxo-2-furanbutyric acid at daily oral doses of 400 mg/kg was tolerated and did not cause any deaths during the test period.

The test for alleviating established inflammation is carried out in the same manner as described above, except that administration of the compound to be tested to the treated animals, or of the vehicle only to the controls, is started only on the 14th day after injection of the mycobacterial adjuvant and is continued for 14 days thereafter, and that results are evaluated on the 28th day. In this test swelling of both hind paws, the injected and the non-injected, is also measured and evaluated as described above. The results obtained with the compounds listed above are essentially the same as described above.

In our test for determination of ulcerogenic activity at therapeutic dose levels, starved rats are isolated in individual cages and are administered the compounds to be tested orally in a vehicle daily for 3 days. On the fourth day the animals are sacrificed and the number and severity of ulcers in the gastro-intestinal tract is determined by visual inspection and scored as follows: the ulcers found are graded according to size and severity as 1, 2, 3, or 4. The number of ulcers found in each category in each animal is multiplied by the respective grade, and the sum of the values obtained within each experimental group of animals is divided by the number of animals in that particular group. The resulting figure is called the ulcer index. In this test, control animals receiving the vehicle only during the test period develop a few minor lesions in the fundal area of the stomach, and an occasional lesion in the glandular area. Indomethacin at dose levels of 5 mg/kg and phenylbutazone at dose levels of 100 mg/kg both increased the incidence and severity of ulcers significantly over control values, while γ-oxo-2-furanbutyric acid did not cause such an increase at dose levels of 100 and 200 mg/kg, but did give a significant increase at 300 mg/kg.

In a modification of the test for antipyretic activity described by Winter et al. in Toxicol. appl. Pharmacol. Vol. 5, p. 247 (1963), male albino rats of about 200 g body weight are injected intravenously with 0.2 ml of a 1:6 dilution of *Bordatella pertussis* vaccine, and body temperature is measured with an oral probe connected to an electrical thermometer. The compounds to be tested are given orally in a vehicle at about the same time as the injection of the vaccine, and untreated controls receive the vehicle only. Generally, temperatures are taken every hour for 6 hours. In this test, the usual temperature increase in untreated controls is about 1.8°C over normal. Phenylbutazone, used as standard, suppresses this increase at doses of 100 mg/kg, and γ-oxo-2-dibenzofuranbutyric acid has essentially the same effect at dose levels of 100 mg/kg.

In our test for determining drug tolerance, male albino rats of about 140 g body weight are caged individually and the compound to be tested is administered orally in a vehicle once daily for at least 30 days and up to 40 days. Body weights are determined at regular intervals, deaths are recorded, and at the end of the test period the animals are sacrificed. Gross examination and weighing of adrenals, kidneys, spleen, testes, liver, heart, and hypophysis is carried out, and stomach and intestines are examined visually for signs of lesions. Controls receiving the vehicle only increase in weight by about 120 per cent in 30 days, and no abnormalities are found upon examination. γ-Oxo-2-dibenzofuranbutyric acid at daily oral doses of 100 mg/kg for 40 days caused no significant change in the growth curve, and no abnormalities were seen in the internal organs of the animals.

From the above data a therapeutic index may be calculated for the compounds tested, by dividing the dose at which the compound was effective in the test for reduction of inflammation into the dose tolerated for 14 days in the same test, "tolerated" is defined as the dose which does not cause obvious signs of toxicity or deaths within the test period. The therapeutic index calculated in this manner for indomethacin is about 2.5, for phenylbutazone about 4, and for γ-oxo-2-dibenzo-furanbutyric acid about 8.

The following Examples are illustrative of this invention.

EXAMPLE 1

γ-Oxo-2-dibenzofuranbutyric acid (25 g) is mixed with 175 g lactose, 44 g starch, 4 g magnesium stearate, and 2 g sucrose. The mixture is granulated with addition of a small amount of ethyl alcohol, dried, milled, and compressed into tablets weighing 250 mg each or filled into capsules in amounts of 250 mg each, to make 1000 tablets or capsules containing 25 mg of the active ingredient per tablet or capsule.

In the same manner, but using 50 g γ-oxo-2-dibenzofuranbutyric acid and 150 g lactose, together with the same amounts of starch, magnesium stearate, and sucrose as above, 1000 tablets or capsules containing 50 mg of the active ingredient per tablet or capsule are obtained.

EXAMPLE 2

γ-Oxo-2-dibenzofuranbutyric acid (25 g) is dissolved in pyrogen-free water (900 ml) by adjusting the pH 7.5-8.5 with sodium hydroxide solution and adding sufficient sodium chloride or sodium citrate or glucose to make the solution isotonic. A preservative such as 0.1 percent weight by volume of Methylparaban and 0.015 percent weight by volume of Propylparaban or 0.5 percent weight by volume of chlorbutanol is added, the solution is made up to 1000 ml, sterilized by filtration or autoclaving, and filled into sterile ampoules or vials, to make a solution for parenteral administration containing 25 mg of the active ingredient per milliliter.

In the same manner, but using 50 g of γ-oxo-2-dibenzofuranbutyric acid and proceeding as above, but without addition of sodium chloride or citrate or glucose, a solution containing 50 mg/ml of the active ingredient is obtained.

Again in the same manner, but using, instead of sodium hydroxide, lithium, potassium, calcium, or ammonium hydroxide, or aqueous solutions of methylamine, dimethylamine, trimethylamine, ethylamine, diethylamine, triethylamine, methyl-ethylamine, mono-, di-, or triethanolamine, ethylenediamine, hexamethylenediamine, pyrrolidine, piperidine, morpholine, piperazine, N-methylmorpholine, N-(2-hydroxyethyl)piperidine, or pyridine, or quaternary bases containing the tetramethyl, methyl-triethanol, or trimethyl-monoethanol ammonium ion, or the N-methylpyridinium, N-methyl-N-(2-hydroxyethyl)-pyrrolidinium, N,N-dimethylmorpholinium, N-methyl-N-(2-hydroxyethyl)-morpholinium, N,N-dimethylpiperidinium, or N-methyl-N-(2-hydroxyethyl)piperidinium ions, the corresponding salts of γ-oxo-2-dibenzofuranbutyric acid are also obtained.

EXAMPLE 3

γ-Oxo-2-dibenzofuranbutyric acid (50 g) is sterilized by autoclaving. The sterile solid is mixed under sterile conditions with 970 ml of sterile sesame oil and 15 ml of sterile benzyl alcohol, and made up to 1000 ml with sterile sesame oil, to make a sterile suspension for parenteral administration containing 50 mg/ml of the active ingredient, which is filled into sterile vials under sterila conditions.

In the same manner, but using an aqueous suspension of carboxymethylcellulose instead of sesame oil and dispersing the γ-oxo-2-dibenzofuranbutyric acid with a mechanical blender and optimally sterilizing by autoclaving, a sterile aqueous suspension containing 50 mg/ml of the active ingredient is obtained and filled into sterile ampoules or vials.

EXAMPLE 4

Carragheenin Paw Edema Test

Male albino rats of about 140 g body weight were divided into groups of six animals each. The volume of the left hind paw up to the hairline of the ankle joint was measured by immersing that limb in mercury and weighing the mercury displaced by the limb.

The sub-plantar area of the left hind paw of each animal was injected with 0.1 ml of a 1 percent solution of carragheenin in distilled water. The compound to be tested was administered orally by gavage one hour before injecting the carragheenin solution, in suspension in water containing small amounts of a surface-active agent ("Tween 80") in such concentration that the doses to be administered was contained in 1 ml of the vehicle per 100 g body weight. The volume of the left hind paw of each animal was determined again three hours after the injection of carragheenin in the same manner as described above. A group of six animals received the vehicle only as untreated controls, and percent reduction in swelling was calculated as described above. All results were calculated as the mean values within a given group of animals and are summarized in Table 1.

TABLE 1

| Time after injection of carragheenin, hours | Treatment and dosage | Increment in volume (swelling +) | % reduction in swelling over controls |
|---|---|---|---|
| 3 | Vehicle only | 28.3 ± 1.6 | — |
| 3 | γ-Oxo-2-dibenzofuranbutyric acid 50 mg/kg | 25.3 ± 3.2 | 11% |
| 3 | γ-Oxo-2-dibenzofuranbutyric acid 100 mg/kg | 17.2 ± 1.3 | 39% |
| 3 | γ-Oxo-2-dibenzofuranbutyric acid 200 mg/kg | 15.3 ± 1.6 | 46% |
| 3 | γ-Oxo-2-dibenzofuranbutyric acid 400 mg/kg | 12.3 ± 1.2 | 57% |
|   | Indomethacin 10 mg/kg | 15.8 ± 1.1 | 44% |

+ Expressed as grams of mercury displaced

EXAMPLE 5

Granuloma Pouch Test

Male albino rats of about 150 g body weight are injected into the dorsal subcutaneous tissue with 25 ml of air. Croton oil (0.1 ml) was injected into thepouch produced as above. One group of animals received 5 mg/kg indomethacin orally by gavage suspended in water containing a surface active agent ("Tween 80") at such concentrations that the dose was divided in a volume of fluid corresponding to 1 ml per 100 g body weight, and this administration was repeated once daily for 5 days. Another group of animals, used as controls, received the vehicle only in the same manner as described above. Two further groups of animals received 25 mg/kg and 50 mg/kg of γ-oxo-2-dibenzofuranbutyric acid respectively, again in the same manner described above. The animals were sacrificed at the 5th day, the pouches were opened, the exudate drained into graduated cylinders, and measured. The granulomatous tissue from each pouch was dissected out, blotted with filter paper and weighed. In the above determinations the mean volumes and weights obtained from each group of animals were used for calculation.

In this test the volume of exudate in the untreated controls was 8.8 ± 0.4 ml. In the group of animals treated with 5 mg/kg indomethacin the volume of exudate was 5.0 ± 0.5 ml equivalent to a reduction of 43 percent over untreated controls. As in the groups of animals treated with 25 mg/kg and 50 mg/kg of γ-oxo- 2-dibenzofuranbutyric acid the volumes of exudate were found as 7.9 ± 0.9 and 5.2 ± 1.1 ml, respectively corresponding to a reduction of 10 percent and 41% over untreated controls, respectively.

The wet weight of the granuloma in the untreated control group was 4.26 g; in the group treated with 5 mg/kg indomethacin 2.81 g, corresponding to a reduction of 34% over untreated controls; and in the two groups treated with 25 mg/kg and 50 mg/kg of γ-oxo-2-dibenzofuranbutyric acid the weights of granuloma were 4.61 and 4.18 g, respectively, thus indicating no reduction in weight over untreated controls.

EXAMPLE 6

TEST FOR REDUCTION OF INFLAMMATION

Male albino rats of about 160 g body weight were divided into groups of 10 animals each. The volumes of both hind paws were determined by plethysmography in mercury and weighing of the mercury displaced as described in Example 4. The animals were then injected into the sub-plantar area of the left hind paw with 0.1 ml of the mycobacterial adjuvant described above. The compounds to be tested were administered orally by gavage immediately following the injection of the mycobacterial adjuvant, and thereafter once daily for a total of 14 days, suspended in water containing small amounts of a surface-active agent ("Tween 80") in such concentrations that the dose to be administered was contained in 1 ml of the vehicle per 100 g of body weight. One group of animals received the vehicle only as untreated controls. On day 14 the volumes of both the injected and the non-injected hind paws were again determined in the manner described above, the increments in volume (swelling) were recorded and results were calculated in the groups of animals which had received treatment as per cent reduction over untreated controls in the manner described above. All data were expressed as mean values within a given group of animals and are summarized in the following Table 2.

No deaths were observed in any of the treated groups during the test period, except for the group which had received 5 mg/kg indomethacin where all animals died within the test period.

EXAMPLE 7

Test for Alleviating Established Inflammation

The test was carried out in exactly the same manner as described in Example 6 on groups of male albino rats of 160 g body weight each, except that administration of the compounds to be tested, or of the vehicle only administered to untreated controls, was started only on day 14 after the injection of the mycobacterial adjuvant. The initial volumes of both hind limbs were determined on day 14 and again on day 28 of the test, both times in the same manner as described in Example 4. Increments in volume (swelling) were recorded and results were calculated in the same manner as described in Example 6. All data were again presented

TABLE 2

| Time after injection of mycobacterial adjuvant, days | Treatment and dosage, mg./kg. | Volume of left hind paw, injected [1] | Volume of right hind paw, non-injected [1] | Increment in volume (swelling) [1] | | Percent reduction in swelling over untreated controls | |
|---|---|---|---|---|---|---|---|
| | | | | Left | Right | Left | Right |
| 0 / 14 | Vehicle only | 23.3 / 54.8 | 23.2 / 34.4 | 31.5 | 11.2 | | |
| 0 / 14 | Indomethacin, 2.5 | 22.4 / 36.9 | 22.4 / 26.0 | 14.5 | 3.6 | 54 | [2] 68 |
| 0 / 14 | Indomethacin, 5.0 | | | | | | ([3]) |
| 0 / 14 | γ-Oxo-2-dibenzofuranbutyric acid, 12.5 | 23.0 / 40.0 | 23.0 / 28.0 | 17.0 | 5.0 | 46 | [2] 55 |
| 0 / 14 | γ-Oxo-2-dibenzofuranbutyric acid, 25 | 21.7 / 43.7 | 21.7 / 30.5 | 22.0 | 8.8 | 31 | [2] 21 |
| 0 / 14 | γ-Oxo-2-dibenzofuranbutyric acid, 50 | 21.4 / 38.2 | 21.4 / 25.7 | 16.8 | 4.3 | 47 | [2] 62 |
| 0 / 14 | Vehicle | 21.8 / 55.8 | 21.8 / 29.2 | 34.0 | 7.4 | | |
| 0 / 14 | Phenylbutazone, 400 | 21.0 / 35.0 | 21.0 / 23.5 | 14.0 | 2.4 | 58 | [4] 67 |
| 0 / 14 | Phenylbutazone, 300 | 22.1 / 38.2 | 22.0 / 24.2 | 16.1 | 2.2 | 52 | [5] 70 |
| 0 / 14 | Phenylbutazone, 200 | 23.1 / 40.8 | 23.1 / 27.0 | 17.7 | 3.9 | 47 | [2] 47 |
| 0 / 14 | γ-Oxo-2-dibenzofuranbutyric acid, 400 | 22.8 / 34.0 | 22.6 / 24.0 | 11.2 | 1.4 | 67 | [2] 81 |
| 0 / 14 | γ-Oxo-2-dibenzofuranbutyric acid, 300 | 23.1 / 37.2 | 23.1 / 25.5 | 14.1 | 2.4 | 58 | [2] 67 |
| 0 / 14 | γ-Oxo-2-dibenzofuranbutyric acid, 200 | 23.8 / 35.5 | 23.5 / 26.5 | 11.7 | 3.0 | 65 | [2] 59 |

[1] Expressed as grams of mercury displaced.
[2] No obvious signs of toxicity or deaths within test period.
[3] All animals died within test period.
[4] 6 of 8 animals dead by day 14.
[5] 4 of 8 animals dead by day 14.

as mean values within a given group of animals and are summarized in the following Table 3.

water containing small amounts of a surface-active agent ("Tween 80") in such concentrations that the

TABLE 3

| Time, day | Treatment, mg./kg. | Volume of left hind paw, injected [1] | Volume of right hind paw, non-injected [1] | Increment in volume (swelling) [1] | | Percent reduction in swelling | |
|---|---|---|---|---|---|---|---|
| | | | | LHP | RHP | LHP | RHP |
| 14 | Vehicle only | 64.2 | 33.8 | 19.1 | 10.0 | | |
| 28 | | 83.3 | 43.8 | | | | |
| 14 | Indomethacin, 2.5 | 63.2 | 33.3 | −18.6 | −4.3 | 197 | 143 |
| 28 | | 44.6 | 29.0 | | | | |
| 14 | Indomethacin, 1.0 | 58.3 | 36.3 | −2.7 | −5.9 | 114 | 159 |
| 28 | | 55.6 | 30.4 | | | | |
| 14 | Phenylbutazone, 100 | 59.3 | 31.2 | −12.5 | −4.8 | 165 | 148 |
| 28 | | 46.8 | 26.4 | | | | |
| 14 | Phenylbutazone, 75 | 63.8 | 39.0 | −13.5 | −8.0 | 170 | 108 |
| 28 | | 50.3 | 31.0 | | | | |
| 14 | Vehicle only | 49.3 | 25.8 | 23.4 | 9.2 | | |
| 28 | | 72.7 | 35.0 | | | | |
| 14 | γ-Oxo-2-dibenzofuranbutyric acid, 100 | 54.8 | 33.3 | −5.6 | −3.3 | 124 | 136 |
| 28 | | 49.2 | 30.0 | | | | |
| 14 | γ-Oxo-2-dibenzofuranbutyric acid, 50 | 56.2 | 28.8 | 4.2 | 2.2 | 82 | 76 |
| 28 | | 60.4 | 31.0 | | | | |
| 14 | γ-Oxo-2-dibenzofuranbutyric acid, 25 | 51.8 | 30.7 | 3.4 | 1 | 85 | 89 |
| 28 | | 55.2 | 31.7 | | | | |

[1] Expressed as grams of mercury displaced.

EXAMPLE 8

Test for Ulcerogenic Activity

Male rats of about 160 g body weight were divided into groups of 6 animals each and were isolated in individual cages. They were given no food and access to water during the test. The compounds to be tested were administered orally suspended in water containing small amounts of a surface-active agent ("Tween 80") daily for 3 days in such concentrations that the dose to be administered was contained in 1 ml of vehicle per 100 g body weight. On the fourth day the animals were sacrificed and the number and severity of ulcers in the gastro-intestinal tract was determined by visual inspection and scored as follows: the ulcers found were graded according to size and severity as 1, 2, 3, or 4. The number of ulcers found in each category in each animal has multiplied by the respective grade, and the sum of the values obtained within each experimental group of animals has divided by the number of animals in that particular group. The resulting figure was called the ulcer index. In this test, control animals receiving the vehicle only during the test period developed a few minor lesions in the fundal area of the stomach, and an occasional lesion in the glandular area. Results are summarized in Table 4.

TABLE 4

| TREATMENT | | ULCER INDEX |
|---|---|---|
| Vehicle Only | | 6 |
| Indomethacin, 20 mg/kg | | 14+ |
| Phenylbutazone, 100 mg/kg | | 13+ |
| Vehicle Only | | 4 |
| γ-Oxo-2-dibenzofuranbutyric, acid | 500 mg/kg | 31+ |
| | 400 mg/kg | 18+ |
| | 300 mg/kg | 7 |
| | 200 mg/kg | 9 |

+ Significant increase in number and severity over Controls

EXAMPLE 9

Test for Antipyretic Activity

Male albino rats of about 200 g body weight in groups of 8 animals each were injected intravenously with 0.2 ml of a 1:2 dilution of *Bordatella pertussis* vaccine, and body temperature was measured with an oral probe connected to an electrical thermometer. The compounds to be tested were given orally suspended in water containing small amounts of a surface-active agent ("Tween 80") in such concentrations that the dose to be administered was contained in 1 ml of vehicle per 100 g of body weight at about the same time as the injection of the vaccines and untreated controls received the vehicle only. Temperatures were taken every hour for 6 hours, and results are summarized in Table 5.

TABLE 5

| | Body Temperature in Degrees Centigrade | | |
|---|---|---|---|
| Time of Reading | Vehicle Only | γ-Oxo-2-dibenzo-furanbutyric acid 100 mg/kg | Phenyl-butazone 100 mg/kg |
| Initial | 37.6±0.1 | 37.6±0.06 | 37.6±0.1 |
| 1 hr. Post Injection | 38.8±0.1 | 37.9±0.2 | 37.7±0.4 |
| 2 | 38.7±0.1 | 37.8±0.2 | 37.8±0.2 |
| 3 | 38.7±0.2 | 37.8±0.1 | 37.8±0.1 |
| 4 | 38.9±0.2 | 37.9±0.2 | 38.2±0.7 |
| 5 | 38.8±0.3 | 37.8±0.2 | 38.1±0.2 |
| 6 | 39.0±0.4 | 37.8±0.2 | 37.9±0.2 |

EXAMPLE 10

Test for Drug Tolerance

Male albino rats of about 140 g body weight were divided into groups of ten animals each and caged individually. The compounds to be tested were administered orally in suspension in water containing small amounts of a surface-active agent ("Tween 80") in such concentrations that the dose to be administered was contained in 1 ml of the vehicle per 100 g body weight once daily for at least 30 days and up to 40 days. Body weights were determined at regular intervals, deaths were recorded, and at the end of the test period the animals are sacrificed. Gross examination and weighing of adrenals, kidneys, stomach testes, liver, heart and pituitary was carried out, and stomach and intestines were examined visually for signs of lesions. Results are summarized in Table 6.

TABLE 6

| Parameter | Controls | γ-Oxo-2-dibenzofuranbutyric acid 100 mg/kg daily |
|---|---|---|
| Body weight, g; initial | 144 ± 1 | 147 ± 2 |
| Day 6 | 177 ± | 180 |
| Day 11 | 204 ± | 194 |
| Day 15 | 244 ± | 224 |
| Day 21 | 282 ± | 268 |
| Day 33 | 340 ± | 322 |

| | | |
|---|---|---|
| Day 42 | 375 ± 8 | 351 ± 12 |
| Heart, g | 1.23 ± 0.03 | 1.14 ± 0.1 |
| Kidneys, g | 2.51 ± 0.1 | 2.63 ± 0.1 |
| Liver, g | 10.98 ± 0.8 | 13.6 ± 1.2 |
| Testes, g | 3.05 ± 0.1 | 2.97 ± 0.1 |
| Adrenals, mg | 52.6 ± 4 | 43.8 ± 6.7 |
| Pituitary, mg | 9.6 ± 0.8 | 9.3 ± 1.1 |
| Stomach | No lesions | Slight irritation |

EXAMPLE 11

Therapeutic Index

From the data obtained in Example 6 a therapeutic index was calculated for the compounds tested by dividing the dose at which the compound was effective in the test for reduction of inflammation (A) into the dose tolerated for 14 days in the same assay (B). Results are shown in Table 7.

TABLE 7

| Compound | Dose Effective in Reduction of Inflammation Test (A) mg/kg | Dose tolerated for 14 days in Prevention of Arthritis Test (B) mg/kg | Therapeutic Index (B/A) |
|---|---|---|---|
| Indomethacin | 1.0 | 2.5 | 2.5 |
| Phenylbutazone | 75 | <300 | 4 |
| γ-Oxo-2-dibenzofuranbutyric acid | 50 | 400 | 8 |

We claim:

1. A pharmaceutical composition in dosage form for the treatment of inflammatory conditions which comprises a pharmaceutically acceptable carrier and from 25 to 250 mg. of an active ingredient selected from the group which consists of γ-oxo-2-dibenzofuranbutyric acid and a water-soluble pharmaceutically acceptable salt thereof.

2. The pharmaceutical composition as defined in claim 1 wherein the active ingredient is γ-oxo-2-dibenzofuranbutyric acid.

3. The pharmaceutical composition as defined in claim 1 wherein the active ingredient is the sodium salt of γ-oxo-2-dibenzofuranbutyric acid.

4. The method for the treatment of inflammatory conditions which comprises administering to patients suffering therewith from 1 to 30 mg. per kilogram of body weight per day of a compound selected from the group which consists of γ-oxo-2-dibenzofuranbutyric acid and a water-soluble pharmaceutically acceptable salt thereof.

5. The method as defined in claim 4 wherein γ-oxo-2-dibenzofuranbutyric acid is administered.

6. The method as defined in claim 4 wherein the sodium salt of γ-oxo-2-dibenzofuranbutyric acid is administered.

* * * * *